United States Patent [19]

Stevens et al.

[11] Patent Number: 4,498,889
[45] Date of Patent: Feb. 12, 1985

[54] VARIATOR DRIVE SYSTEM

[75] Inventors: Aaron A. Stevens, Springhill; Randall K. Lawrence, Fairview, both of Tenn.

[73] Assignee: The Murray Ohio Manufacturing Co., Brentwood, Tenn.

[21] Appl. No.: 511,624

[22] Filed: Jul. 7, 1983

[51] Int. Cl.$^3$ .............................................. F16H 7/12
[52] U.S. Cl. .................................... 474/133; 474/135
[58] Field of Search ...................... 474/133, 134, 135

[56] References Cited

U.S. PATENT DOCUMENTS

| | | | |
|---|---|---|---|
| 4,224,996 | 9/1980 | Dobberpuhl | 474/133 X |
| 4,273,036 | 6/1981 | Kopaska | 474/133 X |

*Primary Examiner*—James A. Leppink
*Assistant Examiner*—Frank H. McKenzie, Jr.
*Attorney, Agent, or Firm*—Cushman, Darby & Cushman

[57] ABSTRACT

A belt drive arrangement is provided which employs a variator to interconnect a powered drive belt and a belt driven to operate either a transaxle or a transmission of a ground-engaging vehicle. The variator is secured to a pivotally mounted support member. The support member is joined to a speed control shaft which is rotatable in response to the actuation of either a foot pedal or a handle. Rotation of the speed control shaft repositions the variator with respect to idler pulleys associated with the driven belt so as to alter the vehicle's speed. Means are provided to rotate the speed control shaft by actuation of the pedal independently of the position of said handle.

4 Claims, 3 Drawing Figures

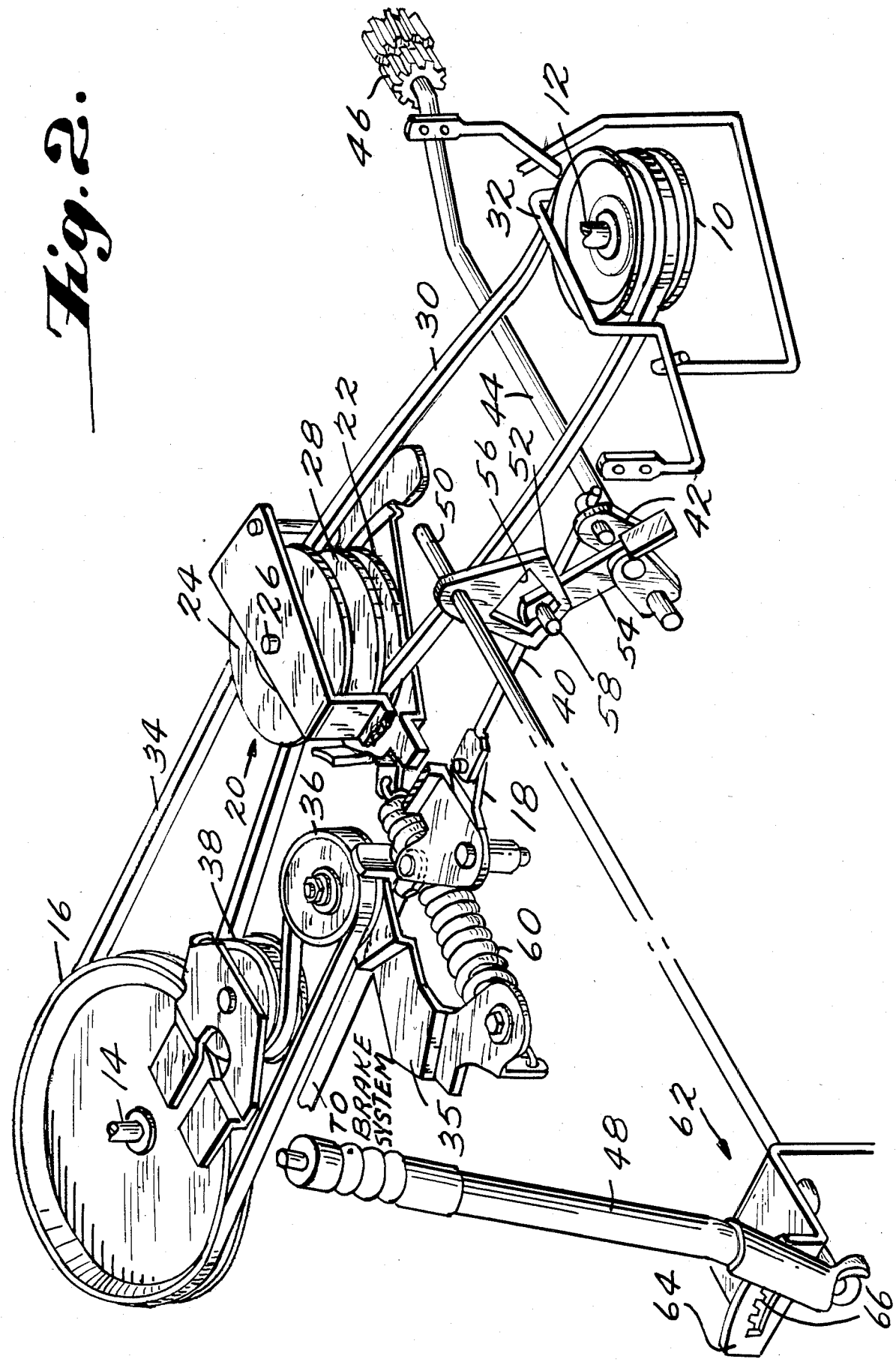

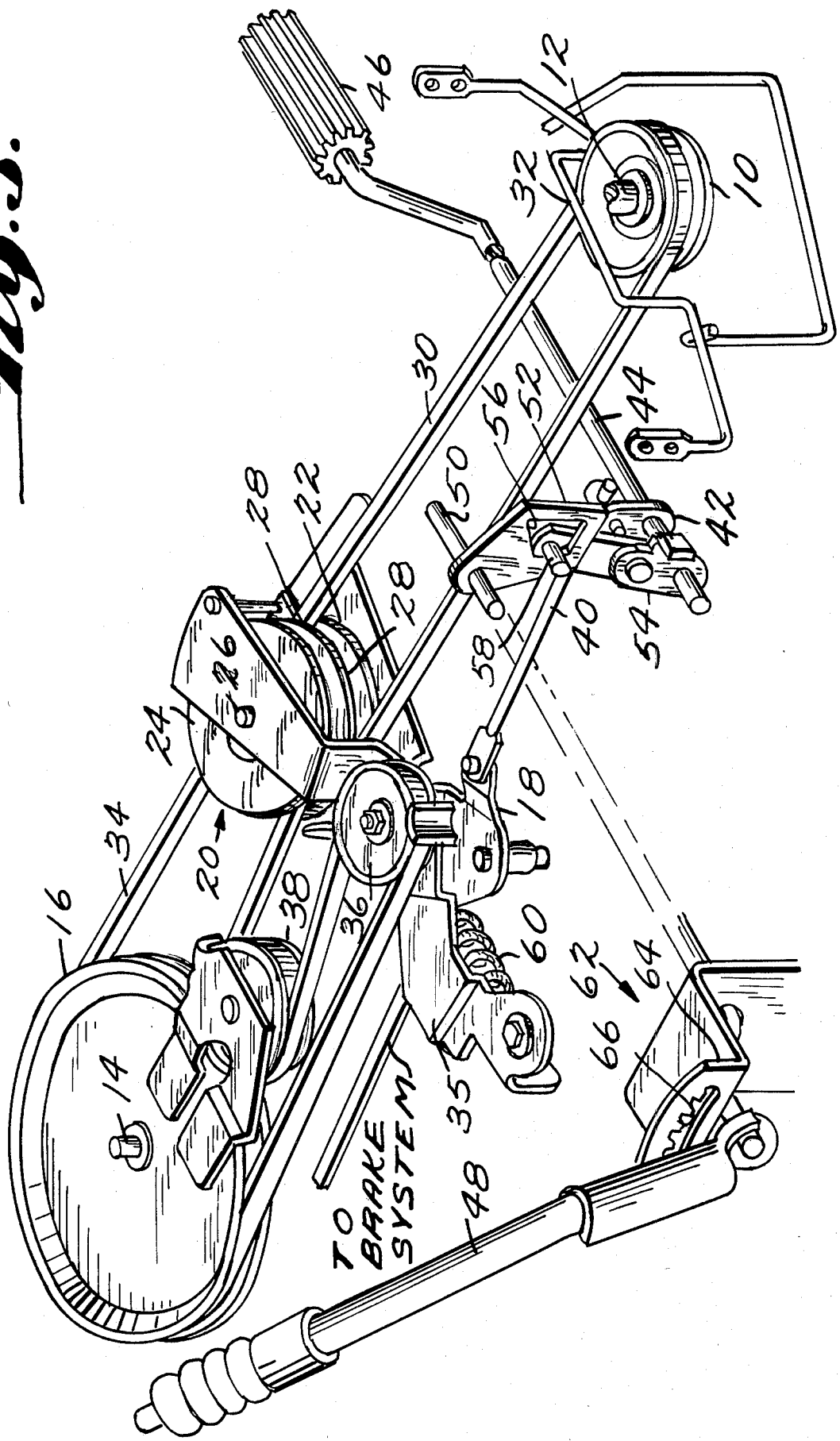

VARIATOR DRIVE SYSTEM

BACKGROUND OF THE INVENTION

The present invention relates to means for driving a vehicle, such as a rider-type lawnmower or a small tractor, wherein the output shaft of an engine is interconnected by a belt drive to a transaxle or transmission which, in turn, is joined to the drive wheels of the vehicle.

The operation of a vehicle of the foregoing type normally requires several speeds in order to accomplish various functions for which the vehicle has been designed. To provide multispeed operation, a gear set conventionally is provided in a gear box. The gear relationships for different speeds then are selected by the operator. However, such an arrangement often is inadequate. For example, due to the differences between gear relationships, it is not infrequently the case that for a particular operation, a given gear selection may cause the engine to stall under load, while the next lowest gear selection may hardly load the engine at all. It therefore is desirable that a variable speed drive be provided to accommodate the differing load requirements likely to be encountered by a rider-type lawnmower or small tractor.

In U.S. Pat. No. 4,310,082 which issued on Jan. 12, 1982 to Raymond L. Elmy, et al, and which is assigned to the assignee of the present application, there is disclosed a belt drive arrangement incorporating a variator which interconnects an engine and the wheel drive of a ground-engaging vehicle. Such a drive arrangement provides a variable speed changing device between the engine and the wheel drive which can be altered without adjusting the engine's throttle and without stopping the vehicle to change gears.

The present invention constitutes an improvement over the variator arrangement disclosed in U.S. Pat. No. 4,310,082. More particularly, the previously patented structure requires a complex linkage to achieve primary and secondary braking functions. The control of the variator by a clutch/brake pedal also requires a camming arrangement and a multiple spring biasing system.

SUMMARY OF THE INVENTION

With the present invention, a simplified structure is employed which produces a number of advantages over the prior art just described. For example, by using a single spring to tension both belt drives of the variator, decreased forces are required to operate the system, and there is a reduction in the tendency of the structure to produce harmonic vibration. Still further, belt tension is better balanced, and the rate at which the variator shifts speeds is increased. By the elimination of a camming arrangement, both pedal and hand controls can be employed to perform speed control functions.

Briefly, the invention comprises a variator which is joined by separate belts to an engine-driven pulley and to a pulley for driving a transaxle or transmission. The variator is held by a pivotally mounted support member, and tension of the belt to the driving pulley is maintained by an idler pulley secured to a pivotally mounted idler arm. The arm and the support member are urged towards one another by a spring which joins them. A variator drive control link is pivotally secured to the support member at one of its ends and is joined to a shaft at its opposite end. The shaft is rotatable by actuation either of a foot pedal or a handle to displace the support member against the force exerted by the spring to thereby alter the relationships between the belts and the variator to cause the speed of the vehicle with which the drive system is associated to vary.

The invention now will be described in greater detail with reference to the accompanying drawings, wherein:

FIG. 2 is a perspective view of the system shown in FIG. 1, but depicted in its clutched and braked position; and FIG. 3 is a perspective view of the system shown in FIG. 1, but depicted in its low speed position.

DETAILED DESCRIPTION OF THE INVENTION

Figure 1:
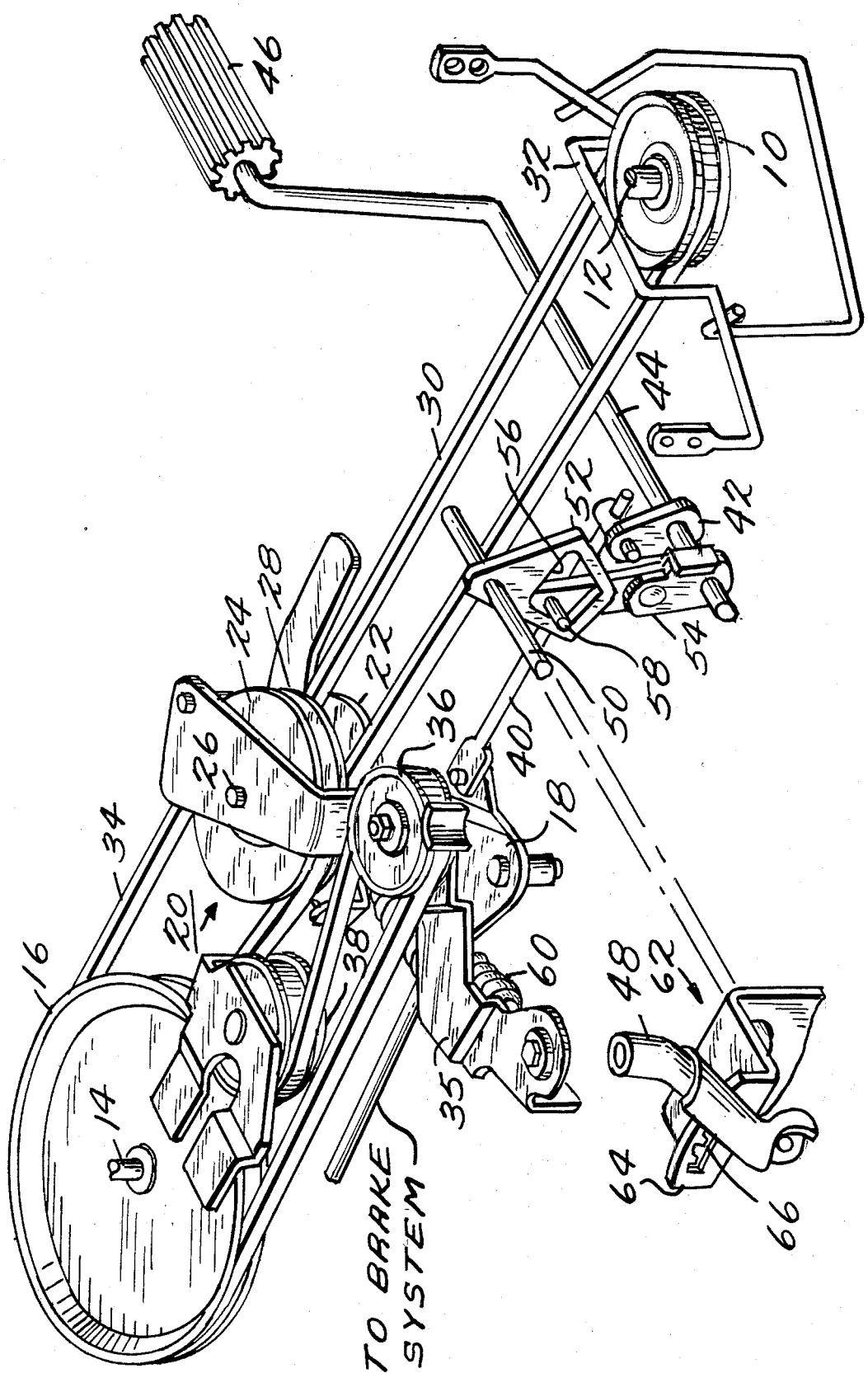
FIG. 1 is a perspective view of the variable speed drive system according to the invention, the system being illustrated in its high speed position.

Referring to FIG. 1, a pulley 10 is joined to a shaft 12 driven by an engine supported by a vehicle frame. For convenience of illustration, the engine and frame are omitted from the drawings.

An additional shaft 14 is arranged in parallel spaced relationship with shaft 12. Shaft 14 is coupled to a conventional transaxle or transmission (not shown) which is mounted to the vehicle frame for driving the wheels of the vehicle. A pulley 16 is secured to shaft 14.

A support member 18 is pivotally joined to the vehicle frame intermediate pulleys 10 and 16. At its outer end, member 18 supports a variator 20. The variator is of conventional construction comprising a pair of frusto-conical disks 22 and 24 secured to a shaft 26 at spaced points along the shaft. An additional pair of frusto-conical disks are joined together in back-to-back relationship on shaft 26 intermediate disks 22 and 24. The element 28 formed by the back-to-back disks is slidably movable along the shaft 26.

A first belt 30 extends around the periphery of pulley 10 and within a first portion of the variator 20 defined by disk 22 and element 28. A belt guide 32 is joined to the vehicle frame adjacent pulley 10 to retain belt 30 in position relative to pulley 10. When the engine is running and belt 30 is sufficiently taut, rotation of pulley 10 is transmitted by belt 30 to cause rotation of the variator about shaft 26.

A second belt 34 passes around pulley 16 and extends within a second portion of variator 20 defined by disk 24 and element 28. The belt 34 also extends about a first idler pulley 36 rotatably secured to one end of an idler arm 35, which is pivotally supported by the vehicle frame at its opposite end, and about a second idler pulley 38 secured in fixed position relative to the vehicle frame. When belt 34 is tensioned by idler pulley 36, rotation of the variator 20 results in belt 34 causing pulley 16 and shaft 14 to rotate, thereby powering the vehicle.

A variator drive control link 40 is pivotally secured at one of its ends to the support member 18. The opposite end of link 40 is pivotally connected to an arm 42 secured to a shaft 44. The shaft 44 is rotatably supported by the vehicle frame, and it is provided at one of its ends with a pedal 46 arranged to be actuated by the operator of the vehicle in such a manner as to control the vehicle's speed, to interrupt the belt drive connection between pulleys 10 and 16, and to brake the vehicle.

A speed control handle 48 also is joined to shaft 44. More particularly, handle 48 is secured to a framesupported shaft 50 which is provided at one of its ends with a slotted plate 52. A two-piece foldable arm 54 is secured at one of its ends to shaft 44. At its opposite end, the arm is provided with a stud 58 which is received within the slot 56 of plate 52.

A clutch spring 60 extends between the pivoted end of idler arm 35 and the variator-supporting end of member 18 (see FIG. 2) in such a manner that the arm and the support member are urged towards one another in opposing directions about their respective pivot points. More particularly, the spring 60 urges support member 18 in a counterclockwise direction about its pivot. Consequently, the variator 20 is biased to move towards pulley 16. The extent of such movement is limited, however, by the engagement of stud 58 with the rear of slot 56 in plate 52 (FIGS. 1 and 3).

The position of plate 52 is established by a conventional multiposition detent arrangement 62 which comprises a bracket 64 fixed to the vehicle frame and having a slotted opening 66 with multiple notches for receiving a conventional spring-loaded locking element associated with the handle 48. Upon selected movement of the handle, plate 52 is displaced towards, or away from, the variator 20.

To achieve the high speed operating condition illustrated in FIG. 1, the handle 48 is moved forwardly in a direction away from variator 20. As a result, plate 52 is displaced towards the variator, and through the action of spring 60, the variator moves towards pulley 16. This causes an increase in tautness of belt 30 and a decrease in tautness of belt 34 notwithstanding the presence of idler pulley 36. Consequently, the assembly of disks 28 is displaced along shaft 26 towards disk 24 whereby belt 34 rides outwardly within the space between disks 28 and 24 while belt 30 moves deeper into the space between disks 28 and 22. Such action results in an increase in the rotational speed of the variator which is translated via belt 34, pulley 16 and shaft 14 to the transaxle or transmission so as to increase the vehicle's ground speed.

While the speed control handle is in the high speed position, the vehicle can be slowed, and even braked, by actuation of pedal 46. Referring to FIG. 2, upon depression of the pedal against the biasing of spring 60, the linkage formed by shaft 44, arm 42 and link 40 pivots support member 18 in a clockwise direction. Such pivoting action is not impeded by plate 52 since stud 58 normally rests against the rear edge of slot 56. As can be appreciated from FIG. 2, depression of the pedal 46 causes arm 54 to fold so as to carry the stud forwardly within slot 56.

When member 18 pivots forwardly, the tautness of belt 34 increases, while that of belt 30 decreases. This causes the disk assembly 28 to move towards disk 22, thereby resulting in belt 30 riding outwardly within the space between disks 28 and 22 so as to decrease the rotational speed of the variator and thus reduce the ground speed of the vehicle.

The member 18 also is connected to a braking system, as generally indicated in the drawings. While the initial depression of the pedal causes a reduction in the vehicle's ground speed in the manner just described, further depression results in slackness of belt 30 and operation of the brakes in a conventional manner. Thus, the pedal arrangement provides a combined clutch/brake actuating system for the vehicle.

As the depression of the pedal 46 is reduced, the spring 60 urges the system back towards the relationship illustrated in FIG. 1 at which high speed operation occurs. Thus, by selective manipulation of the pedal, the operator can control the ground speed of the vehicle independently of the positioning of handle 48 for high speed.

FIG. 3 illustrates the variable speed drive system with the speed control handle 48 in the low speed position. As the handle is moved from the high speed position (FIG. 1), the stud 58 is urged continuously against slot 56 under the influence of spring 60. However, as plate 52 pivots in a counterclockwise direction, the changing contour of slot 56 causes the plate's movement to be translated by stud 58, arm 54, shaft 44 and arm 42 into displacement of link 40 and clockwise pivoting of support member 18. Consequently, the variator 20 moves towards pulley 10 to reduce the tautness of belt 30. As a result, the variator functions in the manner described above to reduce the ground speed of the vehicle. Of course, the vehicle can be braked when handle 48 is maintained in the low speed position, but plate 52 limits the operating speed until the handle 48 is set to a higher speed position.

Summarizing, the system which has been described provides a range of preset speeds of vehicle operation. Additionally, the variator arrangement permits temporary reduction in speed, as well as braking, by the actuation of a foot control pedal, the release of the pedal returning the vehicle to its preset speed. Operation of the foot control does not affect the position of the control for a preset speed. With such a system, the speed of the vehicle can be closely matched to the functions it performs and the changing conditions it encounters.

What is claimed is:

1. A variable speed drive system for a groundengaging vehicle having an engine power source, said system comprising:

a drive pulley connected to an output shaft of said power source;

a support member pivotally connected to said vehicle;

a variator rotatably supported adjacent an end of said member, said variator including first and second belt-receiving portions separated by an element movable along the axis of rotation of the variator for varying the widths of said portions in response to the relative tautness of belts received in said portions;

an additional pulley operatively connected to a shaft for powering said vehilcle;

a first belt operatively related to the drive pulley and received in the first belt-receiving portion of said variator;

a second belt operatively related to the additional pulley and received in the second belt-receiving portion of said variator;

a first idler pulley rotatably connected to said vehicle at a fixed position and engaging said second belt;

a second idler pulley also engaging said second belt and rotatably joined to one end of an idler arm, the opposite end of said arm being pivotally connected to said vehicle;

spring means extending between the support member and the idler arm for urging said member and idler towards one another in opposite directions about their respective pivotal connections whereby the tautness of the second belt is established by the relative positions of the idler pulleys and the variator;

a speed control shaft rotatably supported by said vehicle;

a pedal joined to said speed control shaft to cause rotation thereof in response to actuation of said pedal;

a control handle connected to the speed control shaft to cause rotation thereof in response to actuation of the handle;

means provided in the connection between said handle and the speed control shaft for permitting rotation of said shaft in response to actuation of the pedal independently of the position of said handle; and a variator drive control link connecting the speed control shaft to said support member whereby rotation of the speed control shaft is translated to pivotal movement of the support member to thereby alter the relative positions of the idler pulleys and the variator.

2. A system as set forth in claim 1, wherein said control handle is selectively adjustable.

3. A system as set forth in claim 1, wherein the connection between the handle and the speed control shaft comprises:

an additional shaft secured to said handle and rotatable in response to actuation of the handle, said additional shaft extending parallel to the speed control shaft;

a slotted plate secured to said additional shaft and lying in a plane normal to the rotational axes of said parallel shafts;

an arm secured to the speed control shaft, said arm being provided with a stud which is received within the slot in said plate, said stud normally being biased against the plate by said spring means but being movable relative to the plate along said slot upon actuation of the pedal.

4. A system as set forth in claim 3, wherein said control handle is selectively adjustable.

* * * * *